United States Patent
Wong et al.

(10) Patent No.: US 9,426,102 B1
(45) Date of Patent: Aug. 23, 2016

(54) EFFICIENT CONVERSATION TRANSMISSION TO MOBILE CLIENTS

(71) Applicant: Google Inc., Mountain View, CA (US)

(72) Inventors: Cynthia Wong, Mountain View, CA (US); Debajit Ghosh, Menlo Park, CA (US); Kenneth W. Shirriff, Redwood City, CA (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 13/831,661

(22) Filed: Mar. 15, 2013

Related U.S. Application Data

(60) Provisional application No. 61/611,522, filed on Mar. 15, 2012, provisional application No. 61/611,525, filed on Mar. 15, 2012.

(51) Int. Cl.
*H04L 12/58* (2006.01)

(52) U.S. Cl.
CPC ...................................... *H04L 51/02* (2013.01)

(58) Field of Classification Search
CPC ..... G06Q 10/107; H04L 12/585; H04L 12/58
USPC ....................................................... 709/206
See application file for complete search history.

(56) References Cited

U.S. PATENT DOCUMENTS

| | | | |
|---|---|---|---|
| 6,745,197 B2 * | 6/2004 | McDonald | |
| 7,593,995 B1 * | 9/2009 | He et al. | 709/206 |
| 8,239,467 B2 * | 8/2012 | Lee et al. | 709/206 |
| 8,583,654 B2 * | 11/2013 | Palay | 707/741 |
| 2003/0009595 A1 * | 1/2003 | Collins | 709/247 |
| 2009/0119678 A1 * | 5/2009 | Shih | G06Q 10/10 719/313 |
| 2010/0076989 A1 * | 3/2010 | Jakobson | 707/758 |
| 2011/0231499 A1 * | 9/2011 | Stovicek et al. | 709/206 |

* cited by examiner

*Primary Examiner* — Nicholas Taylor
*Assistant Examiner* — Chong G Kim
(74) *Attorney, Agent, or Firm* — Shumaker & Sieffert, P.A.

(57) ABSTRACT

A first method includes, at a server, receiving a new message in a message thread, identifying quoted text (e.g., text from a previous message in the message thread) in the new message, replacing the quoted text with a token that includes information uniquely associated with the previous message to produce a modified incoming message, and sending the modified incoming message to a client. Optionally, the token includes information identifying the previous message in the message thread. Optionally, the token identifies a range of text in the previous message, and the text replaced by the token corresponds to the range of text in the previous message identified by the token. Optionally, the token comprises a tag having text to be displayed by the client. In some embodiments, the method includes sending to the client all messages in the message thread, including the modified incoming message.

15 Claims, 12 Drawing Sheets

```
From: Joe                    240
To: Bob:
Subject: RE: RE: Hello

I am fine.
--Joe

>From: Bob          ⎫
>To: Joe            ⎪   Message 2 Text
>Subject: RE: Hello ⎬   245
                    ⎪
>Hi Joe. I am fine. How are you? ⎪
>--Bob              ⎭

QUOTE TEXT TOKEN: MESSAGE
1 (<byte range>)
```
Message 3 (modified2)
225

Message 1 — 202
From: Joe
To: Bob
Subject: Hello

Hello Bob! How are you?
--Joe

Figure 2A

Message 2 — 210
From: Bob
To: Joe
Subject: RE: Hello

Hi Joe. I am fine. How are you?
--Bob

>From: Joe
>To: Bob
>Subject: Hello

>Hello Bob! How are you?
>--Joe

{ Message 1 Text 215 }

Figure 2B

Message 2 (modified) — 220
From: Bob
To: Joe
Subject: RE: Hello

Hi Joe. I am fine. How are you?
--Bob

QUOTE TEXT TOKEN: MESSAGE 1 (<byte range>) — 225

Figure 2C

Message 2 (expanded) — 230
From: Bob
To: Joe
Subject: RE: Hello

Hi Joe. I am fine. How are you?
--Bob

>From: Joe
>To: Bob
>Subject: Hello

>Hello Bob! How are you?
>--Joe

{ Message 1 Text 215 }

Figure 2D

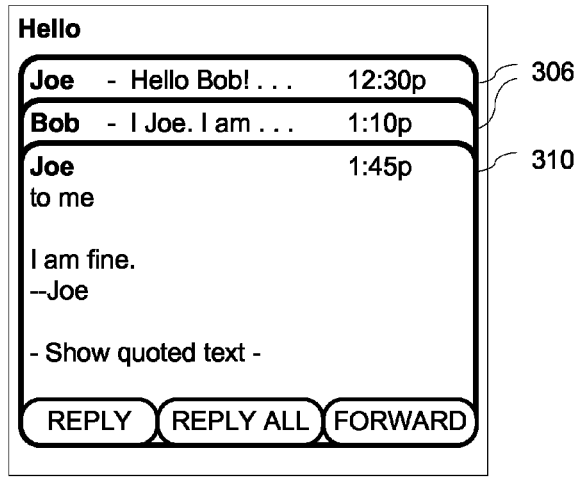
Figure 3C
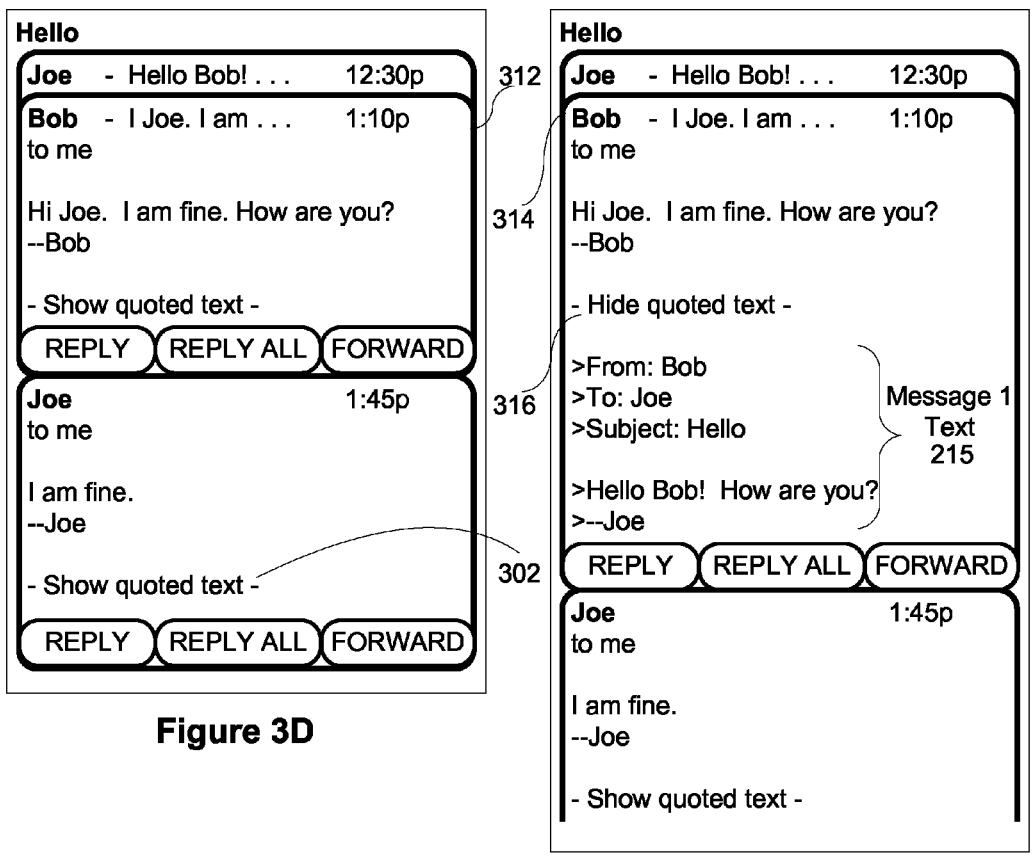
Figure 3D
Figure 3E

EFFICIENT CONVERSATION TRANSMISSION TO MOBILE CLIENTS

RELATED CASES

This application claims priority to U.S. Patent Application No. 61/611,522, filed Mar. 15, 2012, entitled "Efficient Conversation Transmission to Mobile Clients," which application is incorporated by reference herein in its entirety, and U.S. Patent Application No. 61/611,525, filed Mar. 15, 2012, entitled "Message Reply and Forward in Efficient Conversation Transmission System," which application is incorporated by reference herein in its entirety.

TECHNICAL FIELD

The disclosed embodiments generally relate to the field of electronic communications, and in particular, the efficient transmission of electronic communications organized as conversations.

BACKGROUND

Message threads or conversations often include multiple messages and replies to the multiple messages. Typically, when a user replies to or forwards a message, the previous message is included in the reply or forward message as quoted text. As a result, after multiple replies or forwards, a message may contain a large amount of quoted text. In addition, the conversation as a whole may contain the same quoted text multiple times in multiple replies or forwards. Typically, each message in the message thread or conversation is separately transmitted from a server to a client device over a network, and is stored on the client device separately. When the client device is a mobile device, such as a mobile telephone, smart phone, tablet computer, etc., the resulting use of network bandwidth and device storage to receive and store the same information multiple times is expensive and slow and can negatively impact the mobile device's battery life and available storage space.

SUMMARY OF DISCLOSED EMBODIMENTS

In accordance with some embodiments, a server system including one or more processors and memory storing one or more programs, the one or more processors executing the one or more programs to perform a method for managing duplicate data in a message thread, the method includes: receiving an incoming message, where the incoming message corresponds to a new message in a message thread having a plurality of messages. The method also includes identifying quoted text in the incoming message, where the quoted text is text in a previous message in the message thread; replacing the quoted text in the incoming message with a token that includes information uniquely associated with the previous message to produce a modified incoming message; and sending the modified incoming message to a client.

In some embodiments, the token includes information identifying the previous message in the message thread. In some embodiments, the token identifies a range of text in the previous message, and the text replaced by the token corresponds to the range of text in the previous message identified by the token. In some embodiments, the method further includes sending to the client all messages in the message thread, including the modified incoming message. In some embodiments, the token comprises a tag having text to be displayed by the client.

In accordance with some embodiments, a computer system (e.g., a client, server system, etc.) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium has stored therein instructions which when executed by one or more processors, cause a computer system (e.g., a client, server system, etc.) to perform the operations of any of the methods described above.

In accordance with some additional embodiments, a server system includes one or more processors and memory storing one or more programs, the one or more processors executing the one or more programs to perform a method for managing duplicate data in a message thread, the method including receiving an incoming message from a client. The incoming message corresponds to a new message in a message thread having a plurality of messages. The incoming message includes a token in place of and uniquely associated with text from a previous message in the message thread. The method further includes replacing the token in the incoming message with the text from the previous message in the message thread to form an expanded incoming message; and sending the expanded incoming message to a second server.

In some embodiments, the token includes information identifying the previous message in the message thread. In some embodiments, the token identifies a range of text in the previous message, where the text uniquely associated with the token corresponds to the range of text in the previous message identified by the token. In some embodiments, the received incoming message specifies a recipient and the sending comprises sending the expanded message to the recipient.

In accordance with some embodiments, a computer system (e.g., a client, server system, etc.) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium has stored therein instructions which when executed by one or more processors, cause a computer system (e.g., a client, server system, etc.) to perform the operations of any of the methods described above.

BRIEF DESCRIPTION OF THE DRAWINGS

FIG. 2A-2G illustrate exemplary messages transmitted between a server system and client, in accordance with some embodiments.

FIGS. 3A-3E illustrate an exemplary message at a client device, in accordance with some embodiments.

Like reference numerals refer to corresponding parts throughout the drawings.

DESCRIPTION OF EMBODIMENTS

Figure 1:
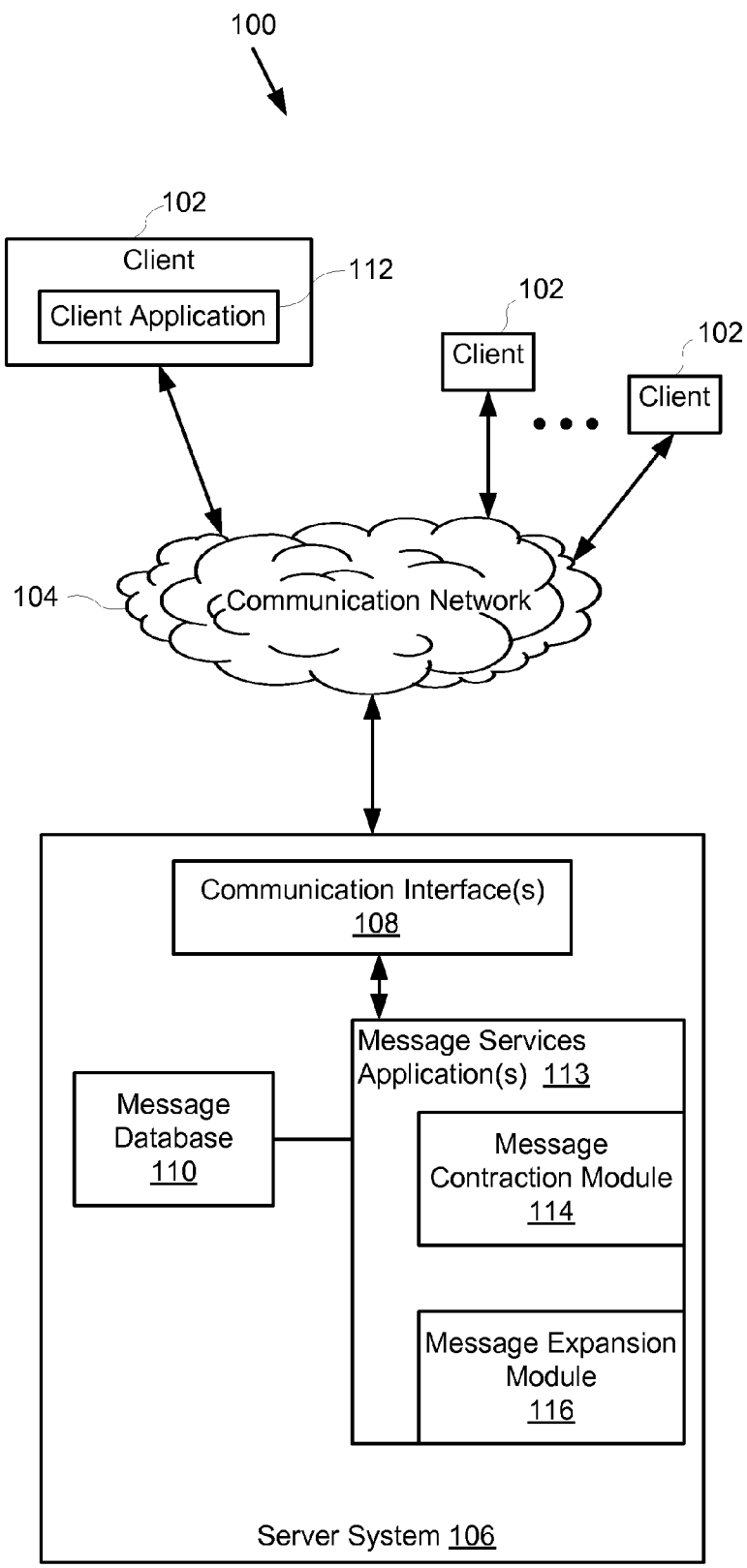
FIG. 1 is a block diagram illustrating a system for managing duplicate data in a message thread, in accordance with some embodiments.

FIG. 1 is a block diagram illustrating a distributed client-server system 100 for managing duplicate data in a message thread. One or more client computers (hereinafter, "clients" or "client devices") 102 may be connected via a communication network 104 to a server system 106 including one or more servers.

Client 102 may be any suitable computer device that is capable of connecting to communication network 104, such as computers, desktop computers, laptop computers, tablet devices, netbooks, internet kiosks, personal digital assistants, mobile phones, gaming devices, or any other device that is capable of receiving electronic communications (e.g., messages) from an information server system 106 (e.g., one or more servers implementing the server functions described below). Client 102 includes one or more processors (e.g., CPU(s) 906, FIG. 9) and memory (e.g., memory 914, FIG. 9) storing one or more programs for execution by the one or more processors. The programs in client 102 include one or more client applications 112 for composing, receiving, and viewing messages. In some embodiments, client application 112 is a software application that permits a user to interact with client 102 and/or network resources such as server system 106 to perform one or more message tasks. For example, client application 112 may be a web browser (e.g., Chrome® (Google Inc.), Firefox® (Mozilla Foundation), Internet Explorer® (Microsoft Corporation), or Safari® (Apple Inc.)) that renders a webmail access webpage, or another type of application that permits a user to search for, browse, and/or use resources, such as one or more webpages on client 102 and/or accessible via the communication network 104. In some embodiments, client application 112 is a stand alone client application, such as an email application (e.g., Outlook® (Microsoft Corporation), or Lotus Notes® (IBM)).

The communication network 104 may be any local area network (LAN) and/or wide area network (WAN), such as an intranet, an extranet, the Internet, or a combination of such networks. It is sufficient that the communication network 104 provides communication capability between clients 102 and information server system 106. In some embodiments, the communication network 104 uses HyperText Transport Protocol (HTTP) to transport information using the Transmission Control Protocol/Internet Protocol (TCP/IP). These or other communication protocols permit client(s) 102 to access various resources available via the communication network 104. The various embodiments described here, however, are not limited to the use of any particular communication protocol. The term "resource" as used throughout this specification refers to any piece of information or service that is accessible via a Uniform Resource Locator (URL) and can be, for example, a webpage, a text or word processing document, a message (e.g., email messages, voice mail message, text message (chat, instant message (IM), or short message service (SMS)), or video message), a transcribed voice message, a database, an image, or a computational object.

Information server system 106 (also called server system 106) is also connected to the communication network 104. Server system 106 includes one or more communication interfaces 108, a message database 110, and one or more message services applications 113. An embodiment of server system 106 is described in more detail below with reference to FIG. 8. Communication interface 108, sometimes called a front end server, facilitates communication between the communication network 104 and message services applications 113.

The message services applications 113 may include one or more modules that generate data for a client-side webmail application or other type of personalized online application that is utilized by a client for displaying various messages, including a message thread. A message may be any of the following: email message, voice mail message, text message (chat, instant message (IM), short message service (SMS)), and video message. In various implementations, a respective message thread contains messages of a single type (e.g., email messages), or messages of two or more types (e.g., some message threads include at least one email message, and one or more messages of the other message types identified above). The message services applications 113 may include a message contraction module 114 and a message expansion module 116. As discussed further below in relation to methods 400 and 500, the message contraction module 114 identifies and elides quoted text in an incoming message and inserts a token in place of the elided quoted text. As discussed further below in relation to methods 400 and 700, the message expansion module 116 replaces the token in an incoming message with associated quoted text (e.g., quoted text that was previously elided by message contraction module 114).

Figure 2G:
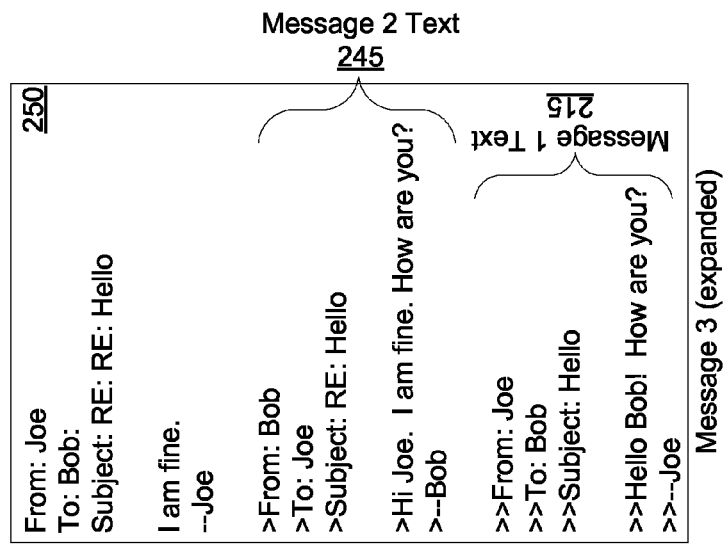
Figure 2F:
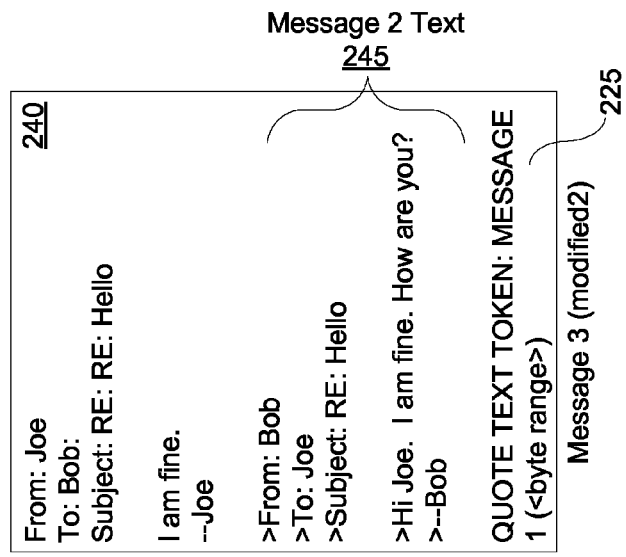
Figure 2E:
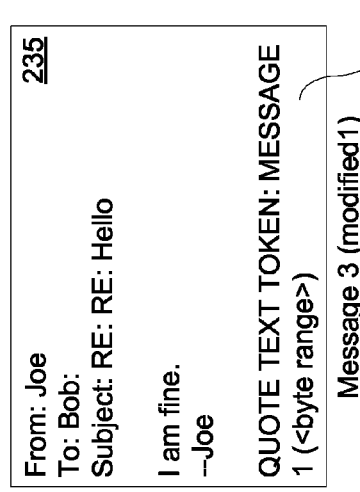
Figure 3A:
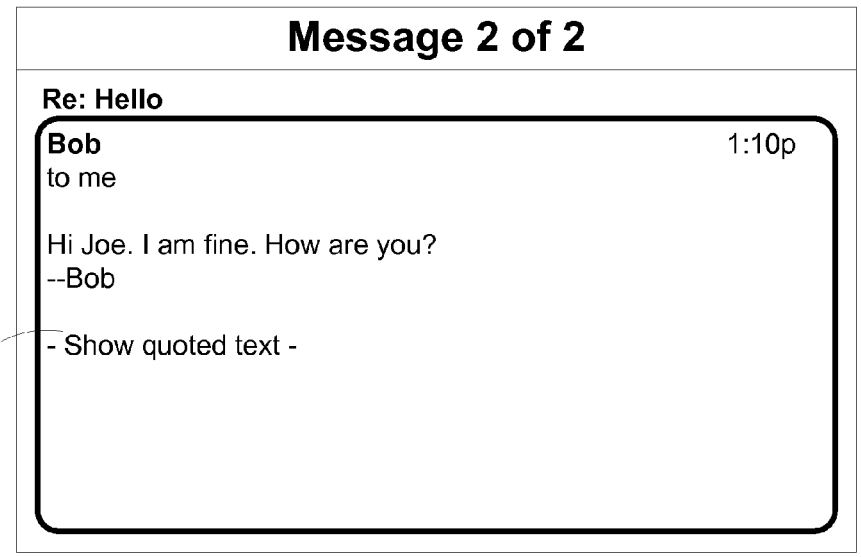
Figure 3B:
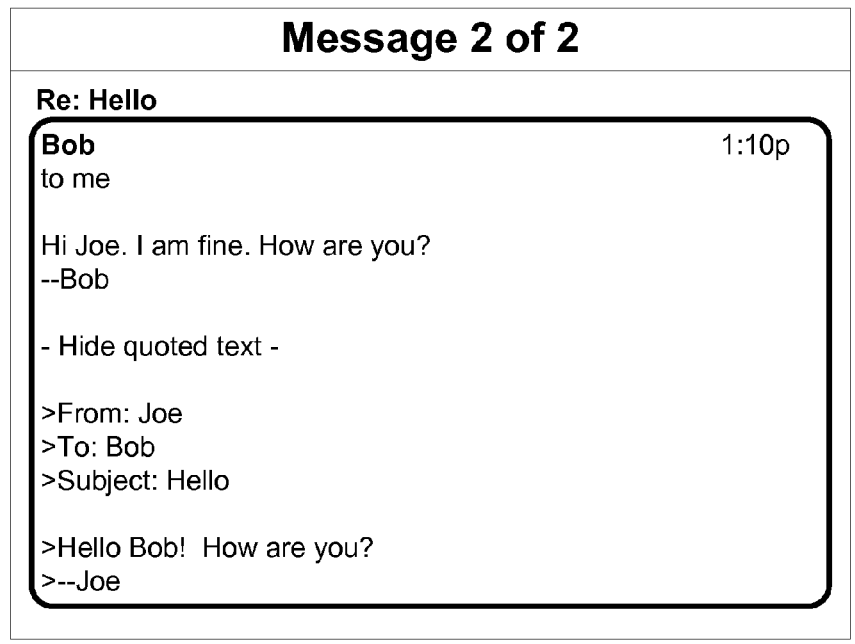

FIGS. 2A-2G illustrate exemplary messages transmitted between server system 106 and client 102 in accordance with some embodiments. FIG. 2A illustrates a first message 202 that includes a header and text provided by a sender of the first message. FIG. 2B illustrates a second message 210 that is part of a message thread including the first message 202 and includes text from a previous message in the message thread (e.g., message 1 text 215) in addition to a header and text provided by a sender of the second message. In some embodiments, the second message is displayed at client 102 without displaying other messages in the message thread (e.g., as illustrated in FIGS. 3A-3B). While in other embodiments, the second message is displayed at client 102 as part of a conversation view that includes displaying one or more other messages in the message thread (e.g., as illustrated in FIGS. 3C-3E).

As described in greater detail below, in some embodiments, when quoted message text is identified in a previous message in the message thread, the quoted message text is replaced with a token (e.g., in FIG. 2C message 1 text 215 in message 2 (modified) 220 has been replaced with a token 225). In some embodiments, the token comprises a tag having text to be displayed by client 102 (e.g., visible text 302 FIG. 3A). In some embodiments, the token comprises a tag that includes or is followed by text to be displayed by client 102 (e.g., visible text 302, FIG. 3A). The token may also indicate a start position of the quoted text and/or a byte range indicating the bytes of data in the message in which the quoted text was previously identified. Additionally, in response to a request from a user to replace the token with the quoted text, a message can be expanded (e.g., Message 2 (expanded) in FIG. 2D) by replacing the token with the quoted text. For example, in FIG. 2D message 2 (expanded) includes the message text 215 that was previously replaced with the token. In the example shown in FIGS. 2B-2D the original message (e.g., message 2 210) and the expanded message (e.g., Message 2 (expanded) 230) are identical. In other embodiments, there may be slight differences between an original message and an expanded message (e.g., an affordance for hiding quoted text may be displayed in the expanded message).

Additionally, in some circumstances a message transmitted between server system 106 and client 102 will include quoted text from multiple messages. In some embodiments, quoted text from multiple different previous messages is replaced with a single token (e.g., 225 in FIG. 2E). In some embodiments, quoted text from multiple different previous messages is replaced with multiple tokens (e.g., one token for each message). In some embodiments, quoted text from a first message is replaced with a token (e.g., 225 in FIG. 2F) while quoted text from a second message (e.g., message 2 text 245) is not replaced and continues to be included in the message. In any of these embodiments, client 102 may receive a request to display the quoted text, and then client 102 will replace the token with the quoted text, as illustrated in FIG. 2G, where the message includes both message 1 text 215 from a first message and message 2 text 245 from a second message.

FIGS. 3A-3B illustrate an exemplary message at client 102. In FIG. 3A, the message (e.g., Message 2 (modified) 300) is displayed at client 102 with visible text (e.g., "—Show quoted text—" 302) displayed in place of the quoted text. In response to a request by a user of client 102 to display the quoted text (e.g., selection of the visible text associated with the token), the quoted text (e.g., Message 1 text 215) is displayed in the message (e.g., Message 2 (expanded) 304) at client 102, as illustrated in FIG. 3B.

FIGS. 3C-3E illustrate an exemplary message displayed in a conversation view at a client 102. In some embodiments, the messages are displayed in a conversation view where multiple distinct messages are displayed in a single view, so that the user can see the current message in context. For example, in FIG. 3C, representations of a plurality of messages (e.g., the first message, the second message and the third message described above) are displayed together in a single conversation view. When the conversation view is in a compressed mode, concise message headers 306 are displayed for messages with first predefined characteristics (e.g., all read messages or all previously received messages, such as the first message and the second message), while messages with second predefined characteristics (e.g., all unread messages or the most recent message such as the third message 310) are displayed.

When the second message 312 is expanded as shown in FIG. 3D (e.g., in response to a user request to view the second message, such as selecting the concise message header associated with the second message), the content of the second message is displayed, including the visible text (e.g., "—Show quoted text—" 302) associated with token displayed instead of quoted text. Subsequently, as described in greater detail above, in response to a request by a user of client 102 to display the quoted text (e.g., selection of the visible text associated with the token), the quoted text (e.g., Message 1 text 215) is displayed in the second message 314 within the conversation view at client 102, as illustrated in FIG. 3E. Additionally, in some embodiments, when the quoted text is displayed different visible text (e.g., "—Hide quoted text—" 316) is displayed which, when selected by a user, causes client 102 to replace the quoted text with the token. It should be understood that replacing quoted text with tokens is particularly advantageous in embodiments where the messages are displayed in a conversation view, because it reduces the amount of duplicate information that is presented to the user. In particular, the quoted text is typically text from previous messages that are already shown in the conversation view, and thus the user can access the quoted text by viewing the text of previous messages in the conversation view even when it is elided from the message.

Figure 4:
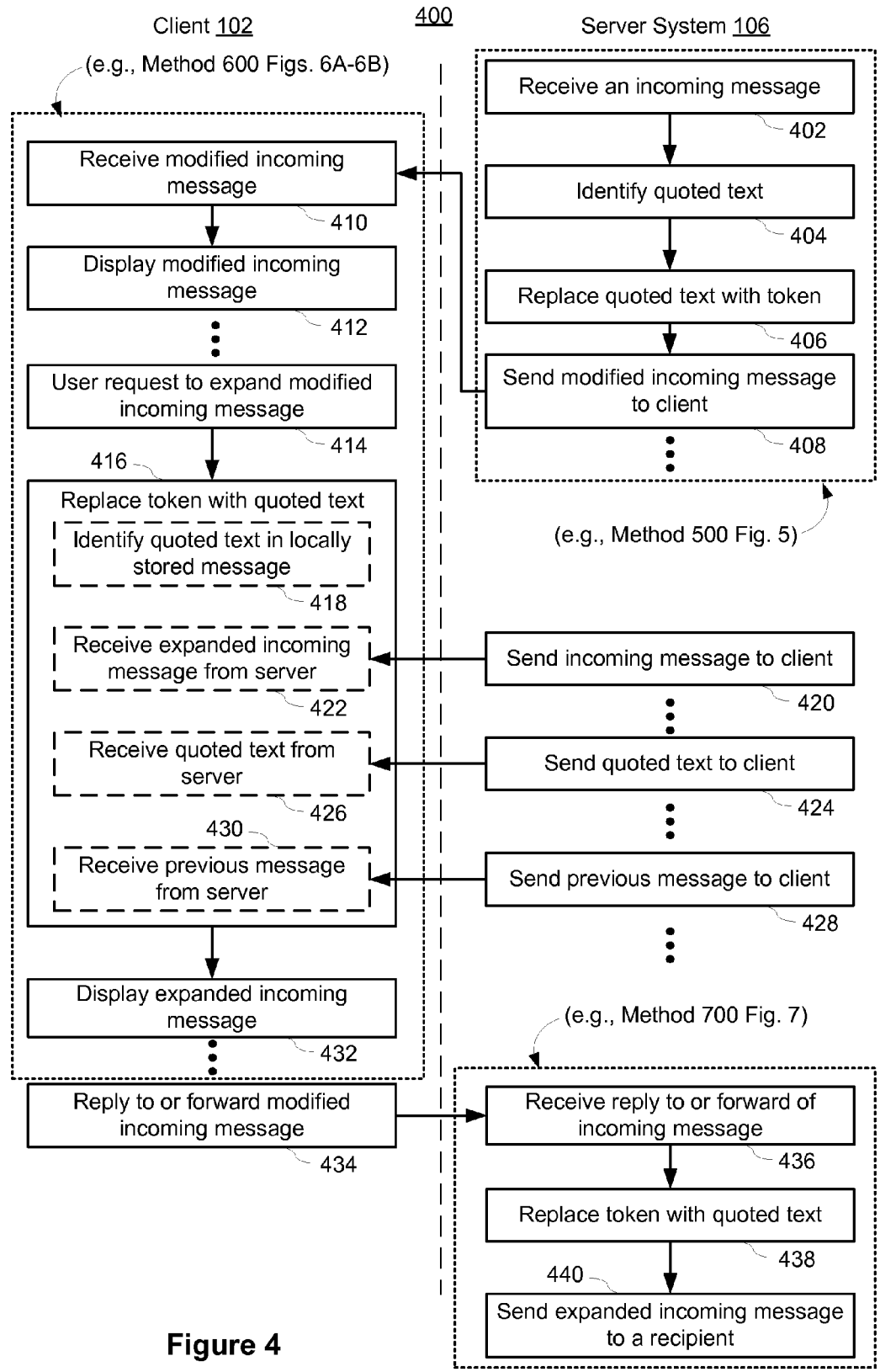
FIG. 4 is a flow diagram illustrating a process for managing duplicate data in a message thread, in accordance with some embodiments.

FIG. 4 is a flowchart representing a method 400 for managing duplicate data in a message thread, according to some embodiments. These methods are governed by instructions that are stored in a computer readable storage medium and that are executed by one or more processors of one or more servers 106 and/or clients 102. Each of the operations shown in FIG. 4 may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, bytecode, object code, or other instruction format that is executed or interpreted by one or more processors.

In some implementations, operations 402-408 correspond to method 500, described in greater detail below with reference to FIG. 5. In some embodiments, operations 410, 412, 414, 418, 422, 426, 430 are client-side operations that correspond to method 600, described in greater detail below with reference to FIGS. 6A-6B. In some embodiments, operations 436-440 correspond to method 700. described in greater detail below with reference to FIG. 7.

Server system 106 receives (402) an incoming message, and identifies (404) quoted text (e.g., message 1 text 215 in FIGS. 2B, 2D and 2G or message 2 text 245 in FIGS. 2F and 2G) in the incoming message. Server system 106 replaces (406) the quoted text with a token (e.g., token 225 in FIG. 2C) to produce a modified incoming message. The token includes information uniquely associated with the first message (e.g., a message identifier for the first message, a start location of the quoted text and a length of the quoted text) and server system 106 sends (408) the modified incoming message to client 102. It should be understood that the identified quoted text may include all or a portion of the text of a previous message. In other words, server system 106 may replace either all of the text, or just a portion of the text, from a previous message that is in the incoming message with the token. A method 500 including operations analogous to steps 402, 404, 406, and 408 is discussed in more detail below in relation to FIG. 5.

Client 102 receives (410) the modified incoming message. Optionally, depending on what operations are currently being performed by client 102, the modified incoming message may then be displayed (412) at client 102. In some embodiments the message is displayed in a message view (e.g., as illustrated in FIGS. 3A-3B). In some embodiments, the message is displayed in a conversation view (e.g., as illustrated in FIGS. 3C-3E). As stated above, message 220 shown in FIG. 2C is an example of the modified incoming message received by client 102. FIG. 3A is a screen shot illustrating the modified incoming message 300 as displayed at client 102 in some embodiments. Messages 2E and 2F are also examples of modified incoming messages as displayed at client 102 in some embodiments.

In some embodiments, the modified incoming message includes visible text (e.g., "—Show quoted text—" 302 in FIGS. 3A and 3D), which is either the user visible portion of token 225 (FIG. 2C), or other text selected for display. The visible text may include an abbreviated portion of text (e.g., the quoted text) from an earlier message in the message thread. Alternatively, visible text 302 may be any suitable predefined text that is displayed by client 102 whenever an incoming message includes a token that replaces quoted text. Another example of text 302 is an ellipsis (" . . . "), which signals the user that quoted text including all or a portion of text from a previous message has been elided from the received incoming message. In some embodiments, the no visible text is displayed, nor is any portion of the token displayed by client 102. For example, in embodiments where the message is displayed in a conversation view, there may be no need for client 102 to display an indication that there is quoted text that has been elided, because the user can simply view a previous message in the conversation view in order to read text from a previous message in the message thread.

Client 102 may receive (414) a request from a user to expand the modified incoming message. In some embodiments, the user initiates this request by selecting the visible text (e.g., "—Show quoted text—" 302 in FIGS. 3A and 3D) (e.g., by performing a tap gesture on a touch screen, activating a predefined button while the visible text is highlighted or performing a mouse click gesture while a cursor is proximate to the visible text). In response to the user request, the token is replaced (416) with the quoted text from the associated previous message to form an expanded incoming message (e.g., Message 2 (expanded) 230 in FIG. 2D). As shown in FIG. 2D, message 230 includes the text from the first message in the message thread (e.g., message 1 text 215). FIG. 3B is a screen shot illustrating the expanded incoming message 304 as displayed at client 102. As shown in FIG. 3B, the modified incoming message includes text from the first message in the message thread (e.g., message 1 text 215).

It should be understood that the token may be replaced with the quoted text using either locally stored information or information received from server system 106. In some embodiments, locally stored messages (e.g., messages stored in memory of client 102) are searched for the previous message. If the previous message is found, the quoted text is then identified (418) in the locally stored copy of the previous message and the token is replaced with the quoted text to generate the expanded incoming message.

In other embodiments (e.g., if the previous message is not found in the locally stored messages), a request is sent to server system 106 for the expanded incoming message, the text from the previous message, or the previous message. In some embodiments, in response to a request from client 102, server system 106 sends (420) the expanded incoming message to client 102, and client 102 receives (422) and, optionally, stores the expanded incoming message. In other embodiments, in response to a request from client 102, server system 106 sends (424) the quoted text to client 102, and client 102 receives (426) and, optionally, stores the quoted text. In some of these embodiments, client 102 subsequently replaces the token with the quoted text received from server system 106 to form the expanded incoming message. In further embodiments, in response to a request from client 102, server system 106 sends (428) the previous message to client 102, and client 102 receives (430) and, optionally, stores the previous message. In some of these embodiments, client 102 identifies the quoted text in the previous message and replaces the token with the quoted text to form the expanded incoming message.

After replacing the token with the quoted text (e.g., as described above,) client 102 displays (432) the expanded message (e.g., 230 in FIG. 2D). A method 600 including operations analogous to steps 410, 412, 414, 416, 418, 422, 426, 430, and 432 (e.g., the steps of method 400 that are performed at client 102) is discussed further below in relation to FIG. 6.

In some embodiments, client 102 replies or forwards (434) the modified incoming message. For example, the user may create a message that includes the modified message without expanding the message, address the created message to a recipient (e.g., another user) and transmit the created message to sever system 106 for delivery to the recipient. The reply to or forward of the modified incoming message is received (436) at server system 106. An example of the reply or forward message as message 235 (e.g., Message 3 (modified1)) in FIG. 2E or message 240 (e.g., Message 3 (modified2)) in FIG. 2F. As shown in FIG. 2F, message 240 is a third message in the message thread and includes text from the second message (e.g., message 2 text 245) in the message thread and token 225. Server system 106 replaces (438) the token in the modified incoming message with the quoted text to form an expanded incoming message. For example, the expanded incoming message may be message 250 (e.g., Message 3 (expanded)) in FIG. 2G. Message 250 is a third message in a message thread and includes text from the first message (e.g., message 1 text 215) and text from the second message in the message thread (e.g., message 2 text 245). As shown in FIG. 4, the expanded incoming message is then sent (440) to a recipient (e.g., the user to whom the message was addressed by the user of client 102). A method 700 including operations analogous to steps 436, 438, and 440 is discussed further below in relation to FIG. 7.

Figure 5:
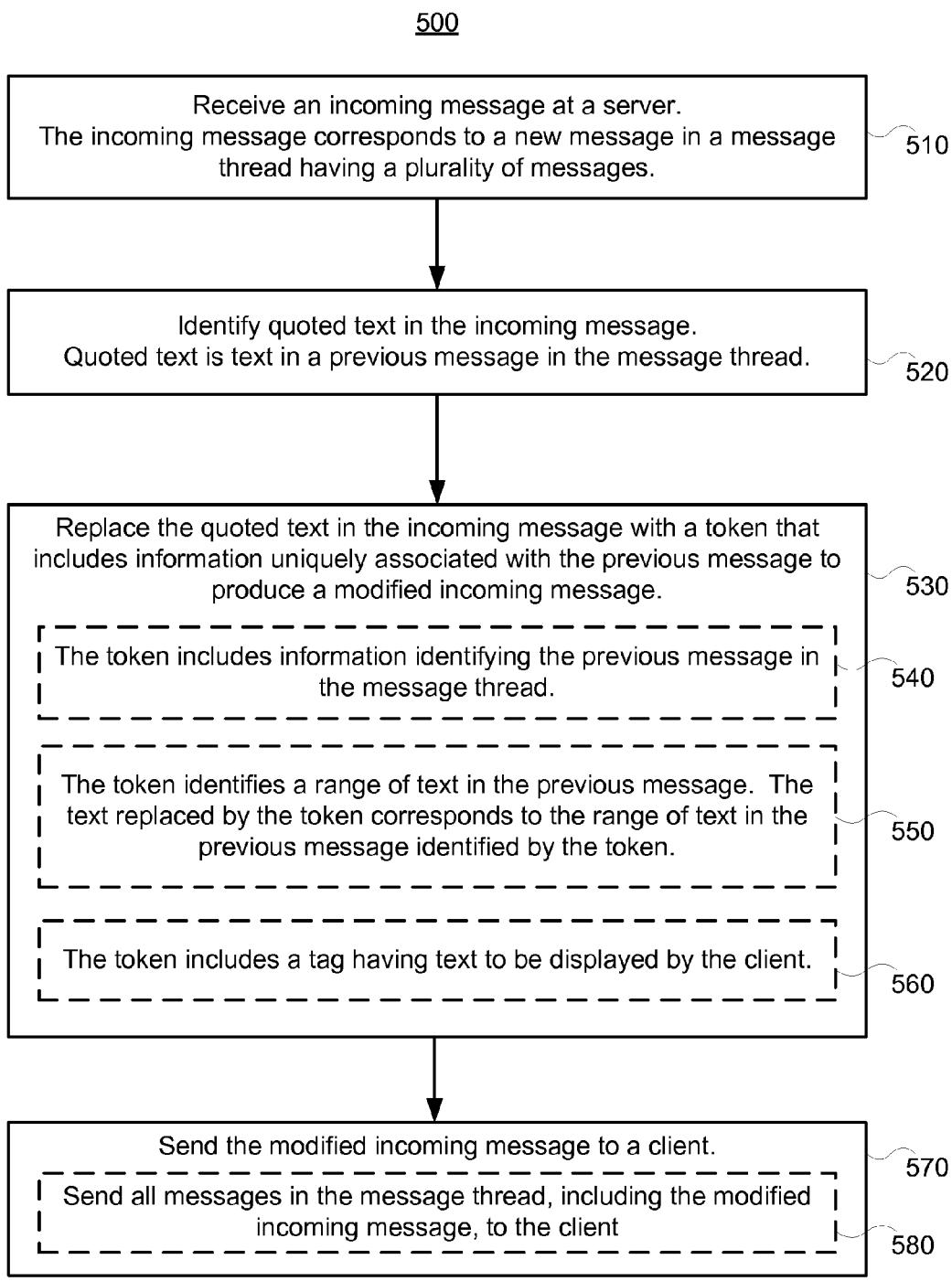
FIG. 5 is a flow diagram of a method for replacing quoted text in a message with a token that is uniquely associated with (e.g., identifies) a previous message that contains the quoted text at a server system, in accordance with some embodiments.

FIG. 5 is a flowchart representing a method 500 for managing duplicate data in a message thread, according to some embodiments. These methods are governed by instructions that are stored in a computer readable storage medium and that are executed by one or more processors of a server system 106. Each of the operations shown in FIG. 5 may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

An incoming message (e.g., message 210 in FIG. 2B) is received (510) at server system 106. The incoming message corresponds to a new message in a message thread having a plurality of messages. Server system 106 identifies (520) quoted text (e.g., Message 1 text 215 in FIG. 2B) in the incoming message. The quoted text is text in a previous message in the message thread.

After identifying quoted text in the incoming message, server system 106 replaces (530) the quoted text in the incoming message with a token (e.g., token 225 in FIG. 2C) that includes information uniquely associated with the previous message to produce a modified incoming message (e.g., message 220 in FIG. 2C). In some embodiments, the token includes (540) information identifying the previous message in the message thread. As one example, the information may be a message identifier that uniquely identifies the message at server system 106 and/or client 102. As another example, the information identifier includes a message offset, indicating how many messages earlier in the conversation the previous message is offset from the current message. In further embodiments, the token identifies (550) a range of text in the previous message, and the text replaced by the token corresponds to the range of text in the previous message identified by the token. For example, the token may identify a starting location of the quoted text within the previous message and a length of the quoted text. In other embodiments, the token includes (560) a tag having text to be displayed by client 102 (e.g., visible text 302 in FIG. 3A), such as "—Show quoted text—".

Server system 106 sends (570) the modified incoming message to client 102. In some embodiments, all of the messages in the message thread, including the modified incoming message, are sent (580) to client 102. Replacing the quoted text with a token prior to sending the modified incoming message to client 102 as described above is advantageous, because the token is typically smaller in size than the quoted text and thus replacing the quoted text with a token reduces the amount of data that is transmitted to and stored at client 102.

Figure 6A:
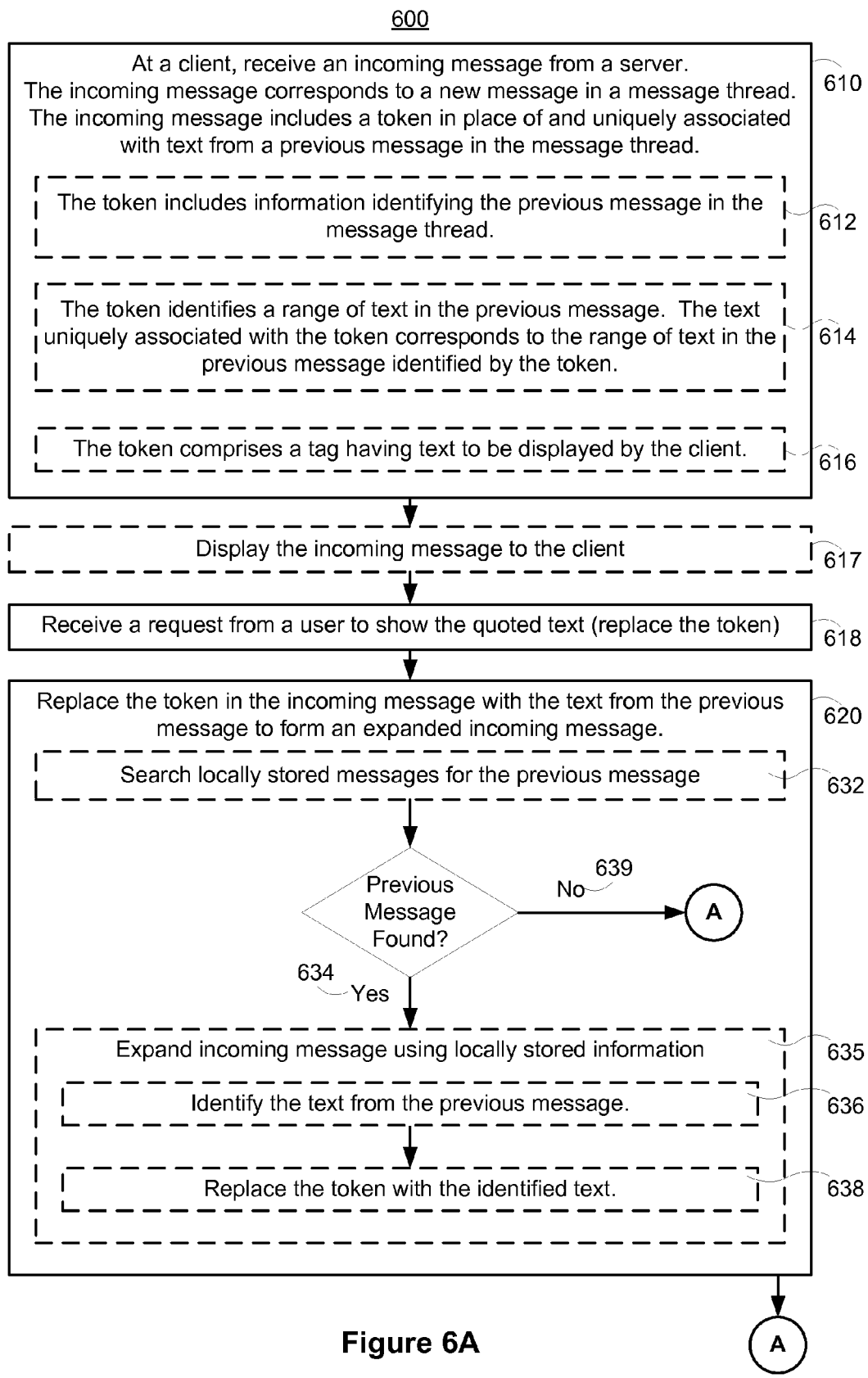
FIGS. 6A and B are flow diagrams of a method for managing duplicate data in a message thread at a client, in accordance with some embodiments.
Figure 6B:
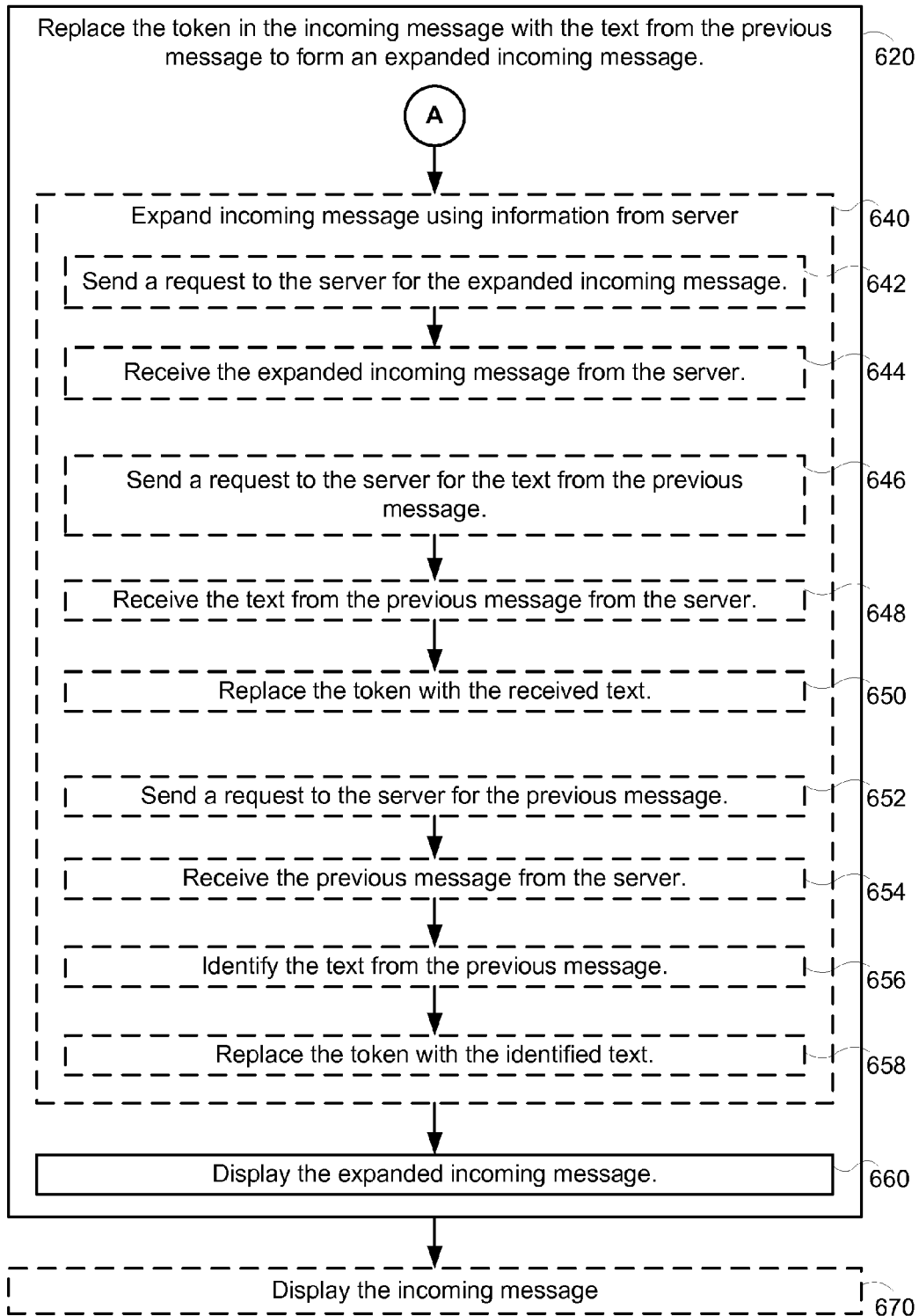

FIGS. 6A-6B include a flowchart representing a method 600 for managing duplicate data in a message thread, according to some embodiments. These methods are governed by instructions that are stored in a computer readable storage medium and that are executed by one or more processors of one or more clients 102. Each of the operations shown in FIGS. 6A-6B may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

As shown in FIG. 6A, an incoming message (e.g., message 220 in FIG. 2C) is received (610) at client 102 (e.g., from server system 106). The incoming message corresponds to a new message in a message thread. The incoming message includes a token (e.g., token 225 in FIG. 2E) in place of and uniquely associated with text (e.g., Message 1 text 215 in FIG. 2B) from a previous message (e.g., Message 1 202 in FIG. 2A) in the message thread. In some embodiments, the token includes (612) information identifying the previous message in the message thread. As one example, the information may be a message identifier that uniquely identifies the message at server system 106 and/or client 102. As another example, the information identifier includes a message offset, indicating how many messages earlier in the conversation the previous message is offset from the current message. In further embodiments, the token identifies (614) a range of text in the previous message thread, and the text uniquely associated with the token corresponds to the range of text in the previous message identified by the token. For example, the token may identify a starting location of the quoted text within the previous message and a length of the quoted text. In other embodiments, the token comprises (616) a tag having text to be displayed by client 102 (e.g., visible text 302 in FIG. 3A and FIG. 3D).

In some embodiments, the incoming message is displayed (617) at client 102. Client 102 may receive (618) a request from a user to show the quoted text (e.g., by replacing the token). In response to the request to show the quoted text, client 102 replaces (620) the token in the incoming message with the text from the previous message to form an expanded incoming message (e.g., message 230 in FIG. 2D). In some embodiments, the incoming message is expanded using locally stored information (e.g., messages stored in local database 922 in FIG. 9 at client 102), if available. In other embodiments, the incoming message is expanded using information from server system 106 without regard to whether or not there is any locally stored information that could be used (e.g., by skipping steps 632-639 and going straight to step 640 after receiving the request to show the quoted text).

In some embodiments, after receiving the request to show the quoted text, client 102 searches (632) the locally stored messages (e.g., messages stored in local database 922 in FIG. 9 at client 102) for the previous message. If the previous message is (634) found in the locally stored messages, client 102 identifies (636) the text from the previous message and replaces (638) the token with the identified text to form the expanded incoming message. However, if the previous message is not (639) found in the locally stored messages, the incoming messages may be expanded (640) using information from server system 106.

In some embodiments where the incoming message is expanded using information received from server system 106, client sends (642) a request to server system 106 for the expanded incoming message and client 102 subsequently receives (644) the expanded incoming message from server system 106. In other embodiments, client 102 sends (646) a request to server system 106 for the text from the previous message and client 102 subsequently receives (648) the text from the previous message from server system 106. Client 102 replaces (650) the token in the incoming message with the received text to form the expanded incoming message. In further embodiments, client 102 sends (652) a request for the previous message to server system 106. Client 102 receives (654) the previous message from server system 106, identifies (656) the text from the previous message, and replaces (658) the token with the identified text.

After client 102 has replaced the token in the incoming message with the text from the previous message to form an expanded incoming message, the expanded incoming message is displayed (660) at client 102 (e.g., so that the user can view the quoted text within the incoming message). In some embodiments, the incoming message is displayed (670) at client 102 without displaying the quoted text. For example, if the user does not request to replace the token with the quoted text, the message will be displayed with the quoted text removed, and visible text (e.g., 302 in FIG. 3A) may, optionally, be displayed to indicate that the quoted text has been removed. Expanding the incoming message at client 102 only when requested by a user and using locally stored information, if possible, as described above is advantageous because the token is typically smaller in size than the quoted text and thus the messages stored at client 102 with the quoted text removed take up less storage space on client 102. In particular, because only messages for which the user requests quoted text have the quoted text restored to the message, client 102 will be able to store more messages to than would be possible if all messages at client 102 included the quoted text by default.

Figure 7:
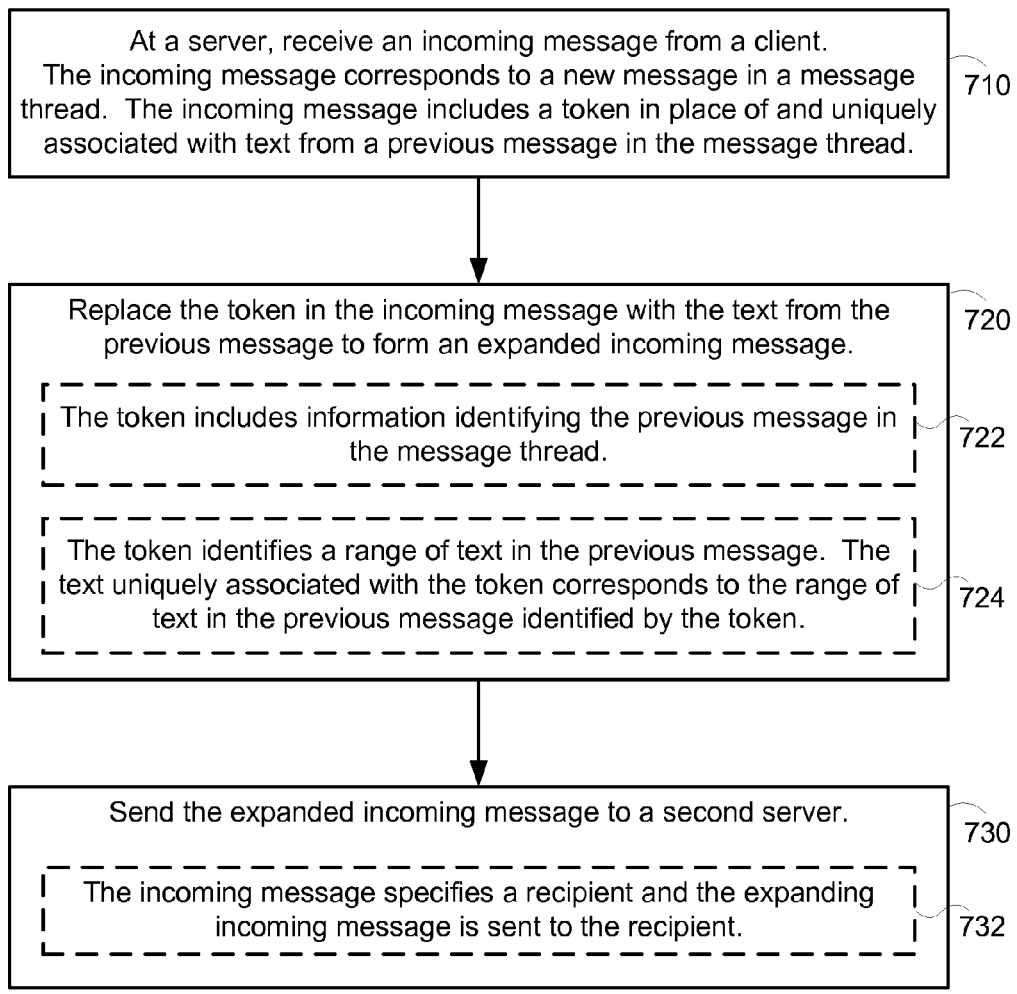
FIG. 7 is a flow diagram of a method for replacing a token in a message with corresponding data associated with an earlier message in a message thread at a server system, in accordance with some embodiments.

FIG. 7 is a flowchart representing a method 700 for managing duplicate data in a message thread, according to some embodiments. These methods are governed by instructions that are stored in a computer readable storage medium and that are executed by one or more processors of server system 106. Each of the operations shown in FIG. 7 may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Server system 106 receives (710) an incoming message (e.g., message 240 in FIG. 2E) is received (710) from client 102. The incoming message corresponds to a new message in a message thread. The incoming message includes a token (e.g., token 225 in FIG. 2E or 2F) in place of and uniquely associated with text from a previous message (e.g., Message 1 text 215 in FIG. 2B) in the message thread.

The token in the incoming message is replaced (720) with the text (e.g., Message 1 text 215 in FIG. 2G) from the previous message to form an expanded incoming message (e.g., message 250 in FIG. 2G). In some embodiments, the token includes (722) information identifying the previous message in the message thread. In further embodiments, the token identifies (724) a range of text in the previous message thread, and the text uniquely associated with the token corresponds to the range of text in the previous message identified by the token.

Server system 106 sends (730) the expanded incoming message to a second server system. In some embodiments, the incoming message specifies a recipient (e.g., a recipient that receives messages via the second server system) and the expanded incoming message is sent (732) to the recipient. It should be noted that sending the expanding incoming message to the recipient means that the expanded incoming message is sent to a message account of the recipient, which in turn means sending the expanded incoming message to a server system 106 that hosts the message account of the recipient. Expanding the incoming message before sending the message to a second server system as described above is particularly advantageous in situations where the second server system is not aware of the processes used by server system 106 to elide and replace quoted text. In particular, sending the modified message to the second server system would make processing the message more difficult for the second server system, because the inserted token would likely not be recognized by the second server system, and thus the second server system could fail to process the message or modify the content of the message in unpredictable ways. Consequently, by expanding the message prior to sending the message to the second server system, server system 106 reduces the possibility of error in the message received by the recipient while retaining the advantages provided by eliding quoted text for messages received by the user of client 102 described above.

Figure 8:
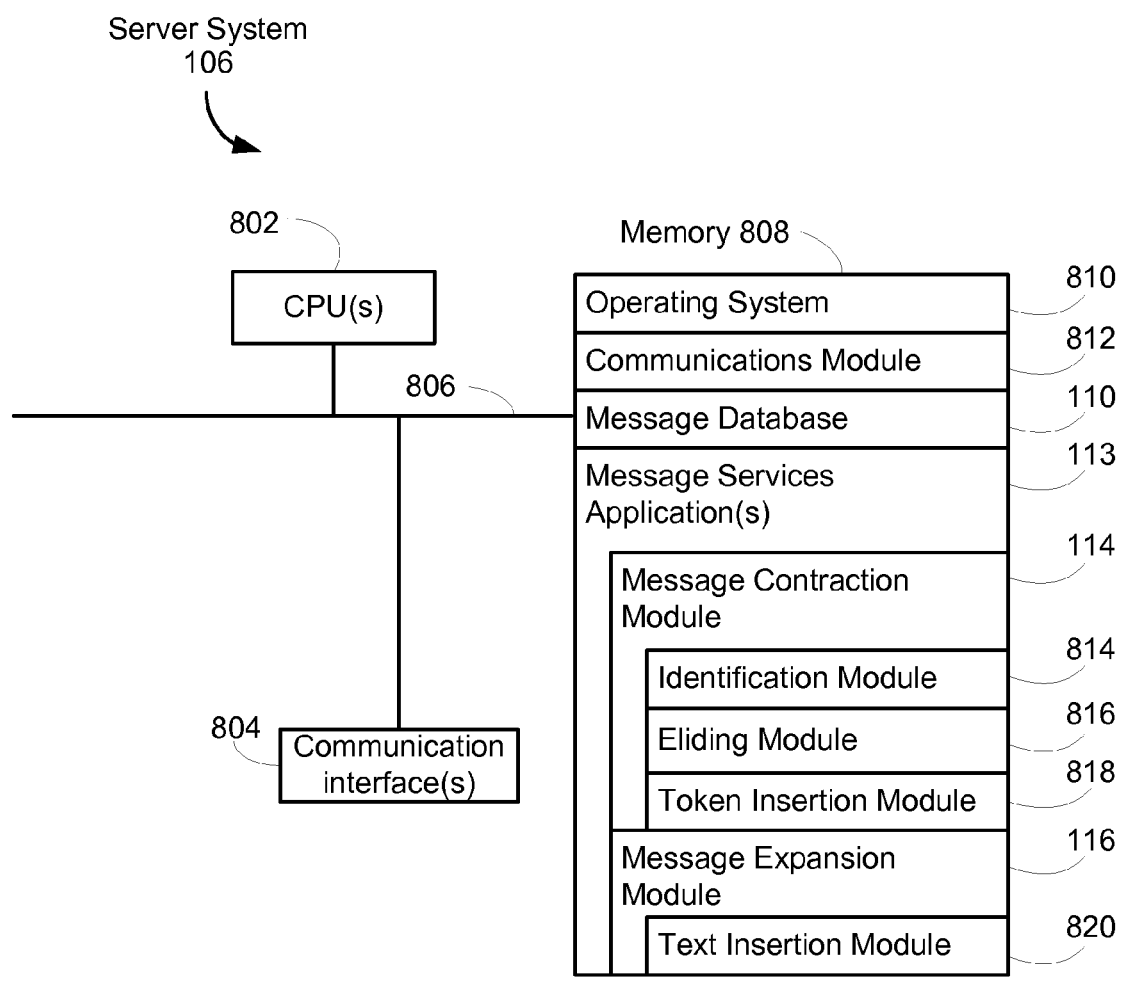
FIG. 8 is a block diagram illustrating an exemplary server system, in accordance with some embodiments.

FIG. 8 is a block diagram illustrating an exemplary server system 106 in accordance with some embodiments. Server system 106 typically includes one or more processing units (CPU(s)) 802, one or more network or other communications interfaces 804, memory 808, and one or more communication buses 806 for interconnecting these components. Communication buses 806 may include circuitry (sometimes called a chipset) that interconnects and controls communications between system components. Memory 808 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 808 may optionally include one or more storage devices remotely located from the CPU(s) 802. Memory 808, or alternately the non-volatile memory device(s) within memory 808, comprises a non-transitory computer readable storage medium. In some embodiments, memory 808 stores the following programs, modules and data structures, or a subset thereof:

operating system 810 that includes procedures for handling various basic system services and for performing hardware dependent tasks;

network communication module 812 that is used for connecting server system 106 to other computer systems via the one or more communication interfaces 804 (wired or wireless) and one or more communication networks, such as the Internet, other wide area networks, local area networks, metropolitan area networks, and so on;

message database 110 for storing messages, including message threads; and one or more message services applications 113, each including a message contraction module 114 and a message expansion module 116.

Network communication module 812 receives an incoming message (e.g., message 210 in FIG. 2B or message 240 in FIG. 2F). The incoming message corresponds to a new message in a message thread having a plurality of messages. A message may include one or more of the following: email message, voice mail message, text message (chat, instant message (IM), or short message service (SMS)), and video message.

In some embodiments, the one or more message services applications 113 may be a webmail application or other type of online message application. As stated above, the one or more message services applications 113 include a message contraction module 114 and a message expansion module 116.

The message contraction module 114 includes an identification module 814, an eliding module 816, and a token insertion module 818. The message contraction module 114 utilizes the identification module 814, the eliding module 816, and the token insertion module 818 to identify and elide quoted text in the incoming message and insert a token in place of the quoted text. The identification module 814 identifies quoted text in the incoming message. The quoted text is text in a previous message (e.g., Message 1 text 215 in FIG. 2B) in the message thread. The eliding module 816 elides the quoted text in the incoming message. The token insertion module 818 inserts the token (e.g., token 225 in FIGS. 2C, 2E-2F) in place of the quoted text to produce a modified incoming message (e.g., message 220 in FIG. 2C, message 235 in FIG. 2E, or message 240 in FIG. 2F). The token includes information uniquely associated with the previous message. In some embodiments, the token includes information identifying the previous message in the message thread. In some embodiments the token identifies a range of text in the previous message, and the text replaced by the token corresponds to the range of text in the previous message identified by the token. In some embodiments, the token comprises a tag having text to be displayed by client 102 (e.g., visible text 302 in FIG. 3A or 3D).

The message expansion module 116 includes a text insertion module 820. The message expansion module 116 utilizes the text insertion module 820 to replace the token (e.g., token 225 in FIGS. 2C and 2E-2F) in an incoming message (e.g., message 220 in FIG. 2C, message 235 in FIG. 2E or message 240 in FIG. 2F) with the associated quoted text. The token is uniquely associated with text (e.g., Message 1 text 215 in FIG. 2B) from a previous message in a message thread. The text insertion module 820 replaces the token in an incoming message with the text from the previous message to form an expanded incoming message (e.g., message 230 in FIG. 2D or message 250 in FIG. 2G).

The network communication module 812 also sends messages either to client 102 or to a server system associated with a recipient. In some embodiments, the network communication module 812 sends the modified incoming message to client 102. In other embodiments, the network communication module 812 sends to client 102 all messages in the message thread, including the modified incoming message. In further embodiments, the network communication module 812 sends the expanded incoming message to a second server system associated with a recipient.

Each of the above identified elements may be stored in one or more of the previously mentioned memory devices. The applications, functions, modules, and operating systems shown in FIG. 8 correspond to a set of instructions for performing the functions described above when executed by the one or more processors 802 of server system 106. The above identified modules or programs (e.g., sets of instructions) need not be implemented as separate software programs, procedures or modules, and thus various subsets of these modules may be combined or otherwise re-arranged in various embodiments. In some embodiments, memory 808 may store a subset of the modules and data structures identified above. Furthermore, memory 808 may store additional modules and data structures not described above.

Although FIG. 8 shows a "server" FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on a single server and single items could be implemented by one or more servers. The actual number of servers used to implement server system 106 and how features are allocated among them will vary from one implementation to another, and may depend in part on the amount of data traffic that the system must handle during peak usage periods as well as during average usage periods. Typically, server system 106 is implemented using multiple servers in order to provide fast, reliable messaging services to a large number (e.g., thousands, or even millions) of users.

Figure 9:
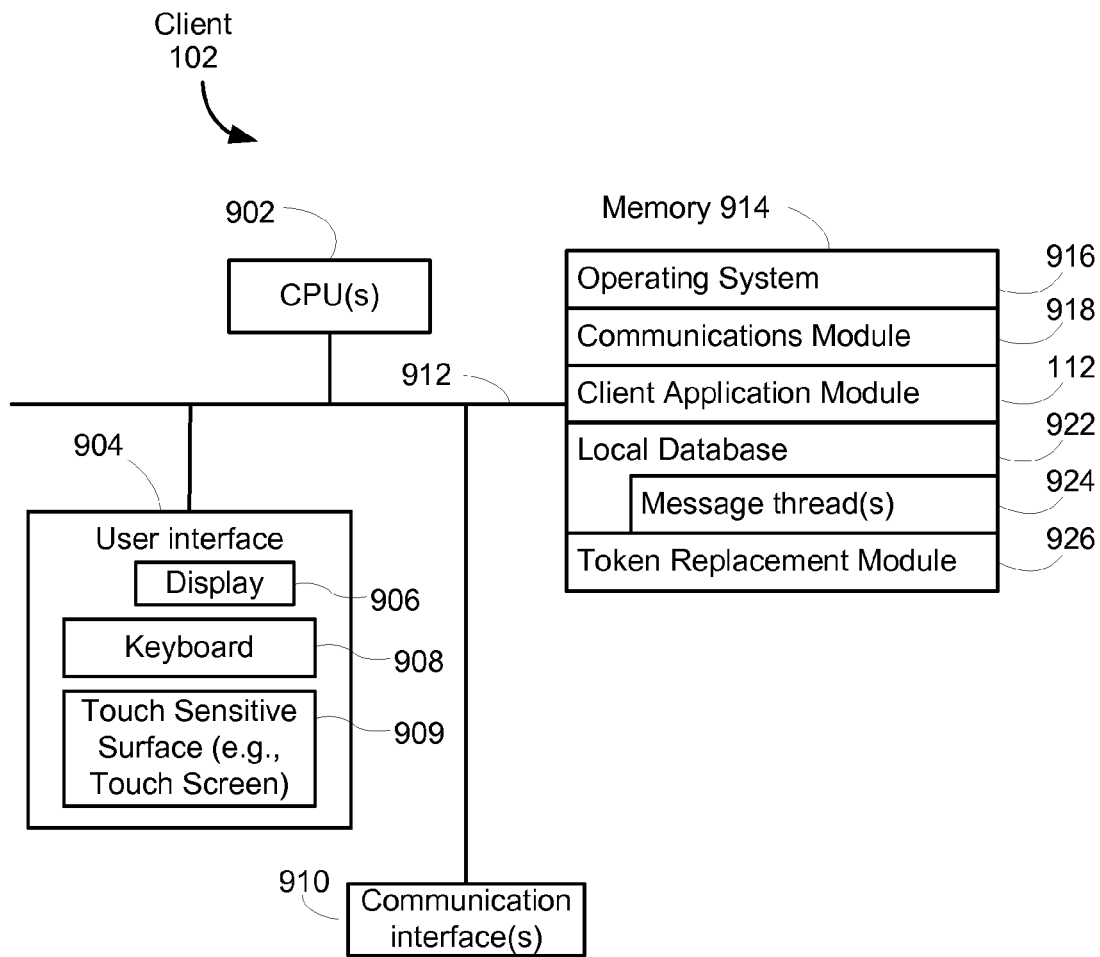
FIG. 9 is a block diagram illustrating an exemplary client, in accordance with some embodiments.

FIG. 9 is a block diagram illustrating an exemplary client 102 (e.g., a client system or a client device) in accordance with some embodiments. Client 102 typically includes one or more processing units (CPU(s)) 902, one or more user interfaces 904, one or more network or other communications interfaces 910, memory 914, and one or more communication buses 912 for interconnecting these components. The communication buses 912 may include circuitry (sometimes called a chipset) that interconnects and controls communications between system components. In some implementations, the one or more user interfaces 904 include a display device 906 and one or more input devices, such as one or more of a keyboard 908, a touch sensitive surface 909 (e.g., a touch screen display) that detects touch or stylus inputs; a track ball; a scroll wheel; or other input mechanism. Memory 914 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 914 may optionally include one or more storage devices remotely located from the CPU(s) 902. Memory 914, or alternately the non-volatile memory device(s) within memory 914, comprises a non-transitory computer readable storage medium. In some embodiments, memory 914 or the computer readable storage medium of memory 914 stores the following programs, modules and data structures, or a subset thereof:

- an operating system 916 that includes procedures for handling various basic system services and for performing hardware dependent tasks;
- a communication module 918 that is used for connecting client 102 to other computer systems (e.g., server system 106) via the one or more communication interfaces 910 (wired or wireless) and one or more communication networks 104 (FIG. 1), such as the Internet, other wide area networks, local area networks, metropolitan area networks, and so on;
- a client application module 112;
- a local database 922, that includes a plurality of message threads 924; and
- one or more token replacement modules 926.

The client application module 112 may be a webmail application or a web browser that is used to render a webmail application or other type of message application. The communication module 918, client application module 112 and the one or more token replacement modules 926 implement the client-side methods described above for receiving messages, replying to messages and replacing tokens in messages.

The communication module 918 receives an incoming message (e.g., message 220 in FIG. 2C) from server system 106. The incoming message corresponds to a new message in a message thread. As explained above, the incoming message may include a token (e.g., token 225 in FIG. 2C) in place of and uniquely associated with text from a previous message (e.g., Message 1 text 215 in FIG. 2D) in the message thread. In some embodiments, the token includes information identifying the previous message in the message thread. Optionally, the token identifies a range of text in the previous message, and the text uniquely associated with the token corresponds to the range of text in the previous message identified by the token. In some embodiments, the token comprises a tag that includes or is followed by text to be displayed by client 102 (e.g., visible text 302 in FIG. 3A). Optionally, the visible text in or following the tag is an abbreviated version of the text in the previous message in the message thread. In response to one or more user commands, display 906 displays the incoming message to the user.

The local database 922 stores messages, including a plurality of message threads 924, in which a user of client 102 is a sender or a recipient of the message. A message may be any of the following: email message, voice mail message, text message (e.g., chat message or instant message (IM)), short message service (SMS) message, and video message. In various implementations, a respective message thread contains messages of a single type (e.g., email messages), or messages of two or more types (e.g., some message threads include at least one email message, and one or more messages of the other message types identified above).

The token replacement module 926 replaces the token in the incoming message with the text from the previous message to form an expanded incoming message (e.g., message 230 in FIG. 2D). As described above, in some embodiments token replacement module 926 searches local database 922, including message threads 924, for the previous message. If the previous message is found in the locally stored messages, the token replacement module 926 identifies the text from the previous message and replaces the token with the previous text to form the expanded incoming message.

In some embodiments, token replacement module 926 utilizes the communication module 918 to send a request to server system 106 for either the expanded incoming message, the text from the previous message, or the previous message.

The request is only sent to server system 106 if the previous message is not found in the local database 922.

When a request is sent to server system 106 for an expanded incoming message, the communication module 918 receives the expanded incoming message from server system 106, and the display 906 displays the expanded incoming message to the user. When a request is sent to server system 106 for text from the previous message (e.g., any identified earlier message in the same message thread), the communication module 918 receives the text from the previous message from server system 106, and token replacement module 926 replaces the token in the incoming message with the received text to form the expanded incoming message. The display 906 displays the expanded incoming message to the user. When a request is sent to server system 106 for the previous message, the communication module 918 receives the previous message from server system 106, and token replacement module 926 identifies the text from the received previous message and replaces the token in the incoming message with the text to form the expanded incoming message. The display 906 displays the expanded incoming message to the user.

Each of the above identified elements may be stored in one or more of the previously mentioned memory devices. The applications, functions, modules, and operating systems shown in FIG. 9 correspond to a set of instructions for performing the functions described above. The set of instructions can be executed by the one or more processors 902 of client 102. The above identified modules or programs (e.g., sets of instructions) need not be implemented as separate software programs, procedures or modules, and thus various subsets of these modules may be combined or otherwise re-arranged in various embodiments. In some embodiments, memory 914 or the computer readable storage medium of memory 914 may store a subset of the modules and data structures identified above. Furthermore, memory 914 or the computer readable storage medium of memory 914 may store additional modules and data structures not described above.

Although FIG. 9 shows a "client," FIG. 9 is intended more as functional description of the various features which may be present in a client device than as a structural schematic of the embodiments described herein. In practice, and as recognized by those of ordinary skill in the art, items shown separately could be combined and some items could be separated.

The foregoing description, for purpose of explanation, has been described with reference to specific embodiments. Many modifications and variations are possible in view of the above teachings. The embodiments were chosen and described in order to best explain both principles and practical applications, to thereby enable others skilled in the art to best utilize the various embodiments with various modifications as are suited to the particular use contemplated.

What is claimed is:

1. A method comprising:
   at a server system including one or more processors and a memory storing one or more programs, the one or more processors executing the one or more programs to perform operations comprising:
   receiving an incoming message, wherein the incoming message corresponds to a new message in a message thread having a plurality of messages;
   identifying first quoted text and second quoted text that are each included in the incoming message, wherein the first quoted text is included in a first previous message of the message thread, and wherein the second quoted text is included in a second previous message of the message thread;
   replacing the first quoted text and the second quoted text in the incoming message with respective first and second tokens to produce a modified incoming message, wherein the first token provides a first information identifier that includes a first message offset to indicate how many messages earlier in the message thread the first previous message is offset from the incoming message, and wherein the second token provides a second information identifier that includes a second message offset to indicate how many messages earlier in the message thread the second previous message is offset from the incoming message; and
   sending the modified incoming message to a client system distinct from the server system.

2. The method of claim 1, wherein the operations further comprise:
   sending to the client system all messages in the message thread, including the modified incoming message.

3. The method of claim 1, wherein the first token comprises a first tag having first text to be displayed by the client system, and wherein the second token comprises a second tag having second text to be displayed by the client system.

4. A server system, comprising:
   one or more processors;
   a memory; and
   one or more programs stored in the memory, the one or more programs comprising instructions that, when executed by the one or more processors, cause the server system to:
   receive an incoming message, wherein the incoming message corresponds to a new message in a message thread having a plurality of messages;
   identify first quoted text and second quoted text that are each included in the incoming message, wherein the first quoted text is included in a first previous message of the message thread, and wherein the second quoted text is included in a second previous message of the message thread;
   replace the first quoted text and the second quoted text in the incoming message with respective first and second tokens to produce a modified incoming message, wherein the first token provides a first information identifier that includes a first message offset to indicate how many messages earlier in the message thread the first previous message is offset from the incoming message, and wherein the second token provides a second information identifier that includes a second message offset to indicate how many messages earlier in the message thread the second previous message is offset from the incoming message; and
   send the modified incoming message to a client system distinct from the server system.

5. The server system of claim 4, wherein the one or more programs further comprise instructions to send all messages in the message thread, including the modified incoming message, to the client system.

6. The server system of claim 4, wherein the first token comprises a first tag having first text to be displayed by the client system, and wherein the second token comprises a second tag having second text to be displayed by the client system.

7. A non-transitory computer readable storage medium storing one or more programs comprising instructions that, when executed by one or more processors of a computer system, cause the computer system to:

receive an incoming message, wherein the incoming message corresponds to a new message in a message thread having a plurality of messages;

identify first quoted text and second quoted text that are each included in the incoming message, wherein the first quoted text is included in a first previous message of the message thread, and wherein the second quoted text is included in a second previous message of the message thread;

replace the first quoted text and the second quoted text in the incoming message with respective first and second tokens to produce a modified incoming message, wherein the first token provides a first information identifier that includes a first message offset to indicate how many messages earlier in the message thread the first previous message is offset from the incoming message, and wherein the second token provides a second information identifier that includes a second message offset to indicate how many messages earlier in the message thread the second previous message is offset from the incoming message; and send the modified incoming message to a client system distinct from the computer system.

8. The non-transitory computer readable storage medium of claim 7, wherein the one or more programs further comprise instructions to send all messages in the message thread, including the modified incoming message, to the client system.

9. The non-transitory computer readable storage medium of claim 7, wherein the first token comprises a first tag having first text to be displayed by the client system, and wherein the second token comprises a second tag having second text to be displayed by the client system.

10. A method comprising:

at a server system including one or more processors and a memory storing one or more programs, the one or more processors executing the one or more programs to perform operations comprising:

receiving an incoming message from a client distinct from the server system, wherein the incoming message corresponds to a new message in a message thread having a plurality of messages, the incoming message including first and second tokens in place of respective first and quoted text, the incoming message providing a first information identifier that includes a first message offset to indicate how many messages earlier in the message thread that a first previous message having the first quoted text is offset from the incoming message, and the incoming message further providing a second information identifier that includes a second message offset to indicate how many messages earlier in the message thread that a second previous message having the second quoted text is offset from the incoming message;

replacing the first and second tokens in the incoming message with the respective first and second quoted text to form an expanded incoming message; and sending the expanded incoming message to a second server system.

11. The method of claim 10, wherein the received incoming message specifies a recipient and the sending comprises sending the expanded message to the recipient.

12. A server system, comprising:
one or more processors;
a memory; and
one or more programs stored in the memory, the one or more programs comprising instructions that, when executed by the one or more processors, cause the server system to:

receive an incoming message from a client distinct from the server system, wherein the incoming message corresponds to a new message in a message thread having a plurality of messages, the incoming message including first and second tokens in place of respective first and quoted text, the incoming message providing a first information identifier that includes a first message offset to indicate how many messages earlier in the message thread that a first previous message having the first quoted text is offset from the incoming message, and the incoming message further providing a second information identifier that includes a second message offset to indicate how many messages earlier in the message thread that a second previous message having the second quoted text is offset from the incoming message;

replace the first and second tokens in the incoming message with the respective first and second quoted text to form an expanded incoming message; and send the expanded incoming message to a second server system distinct from the server system.

13. The server system of claim 12, wherein the received incoming message specifies a recipient and the instructions to send comprise sending the expanded message to the recipient.

14. A non-transitory computer readable storage medium storing one or more programs configured for execution by a computer system, the one or more programs comprising instructions that, when executed by one or more processors of the computer system, cause the computer system to:

receive an incoming message from a client distinct from the server system, wherein the incoming message corresponds to a new message in a message thread having a plurality of messages, the incoming message including first and second tokens in place of respective first and quoted text, the incoming message providing a first information identifier that includes a first message offset to indicate how many messages earlier in the message thread that a first previous message having the first quoted text is offset from the incoming message, and the incoming message further providing a second information identifier that includes a second message offset to indicate how many messages earlier in the message thread that a second previous message having the second quoted text is offset from the incoming message;

replace the first and second tokens in the incoming message with the respective first and second quoted text to form an expanded incoming message; and send the expanded incoming message to a server system distinct from the computer system.

15. The non-transitory computer readable storage medium of claim 14, wherein the received incoming message specifies a recipient and the instructions to send comprise sending the expanded message to the recipient.

* * * * *